(12) United States Patent
Weber

(10) Patent No.: US 12,106,898 B2
(45) Date of Patent: Oct. 1, 2024

(54) PERMANENT MAGNET FOR USE IN AN ELECTRIC MACHINE WITH ONE OR MORE GROOVES

(71) Applicant: BOMATEC MANAGEMENT AG, Hori (CH)

(72) Inventor: Kurt Weber, Hochfelden (CH)

(73) Assignee: BOMATEC MANAGEMENT AG, Hori (CH)

( * ) Notice: Subject to any disclaimer, the term of this patent is extended or adjusted under 35 U.S.C. 154(b) by 396 days.

(21) Appl. No.: 17/633,416

(22) PCT Filed: Aug. 12, 2019

(86) PCT No.: PCT/EP2019/071595
§ 371 (c)(1),
(2) Date: Feb. 7, 2022

(87) PCT Pub. No.: WO2021/028017
PCT Pub. Date: Feb. 18, 2021

(65) Prior Publication Data
US 2022/0293318 A1    Sep. 15, 2022

(51) Int. Cl.
*H01F 7/02* (2006.01)
*H01F 41/02* (2006.01)

(52) U.S. Cl.
CPC ......... *H01F 7/021* (2013.01); *H01F 41/0253* (2013.01)

(58) Field of Classification Search
CPC ... H01F 7/021; H01F 41/0253; H02K 1/2726; H02K 15/03
See application file for complete search history.

(56) References Cited

U.S. PATENT DOCUMENTS

| | | | |
|---|---|---|---|
| 5,506,557 A | 4/1996 | Sakaguchi et al. | |
| 2004/0045637 A1* | 3/2004 | Tanaka | B28D 5/0076 148/301 |
| 2019/0088392 A1* | 3/2019 | Azar | H02K 1/27 |

FOREIGN PATENT DOCUMENTS

| | | | | |
|---|---|---|---|---|
| EP | 1976096 A2 | 10/2008 | | |
| EP | 2306620 A2 | 4/2011 | | |
| EP | 2760112 A1 * | 7/2014 | | H02K 1/17 |
| GB | 2331809 A | 6/1999 | | |
| JP | 2002272033 A | 9/2002 | | |
| WO | WO-2020030241 A1 * | 2/2020 | | |

OTHER PUBLICATIONS

International Search Report with Written Opinion from PCT Application No. PCT/EP2019/071595, Apr. 17, 2020.

* cited by examiner

*Primary Examiner* — Mohamad A Musleh
(74) *Attorney, Agent, or Firm* — Workman Nydegger

(57) ABSTRACT

A permanent magnet for use in an electric machine is provided. The permanent magnet is formed as a one-piece hollow cylinder, in particular a hollow circular cylinder. The permanent magnet includes one or more grooves dividing the permanent magnet in at least two sections that are interconnected.

20 Claims, 2 Drawing Sheets

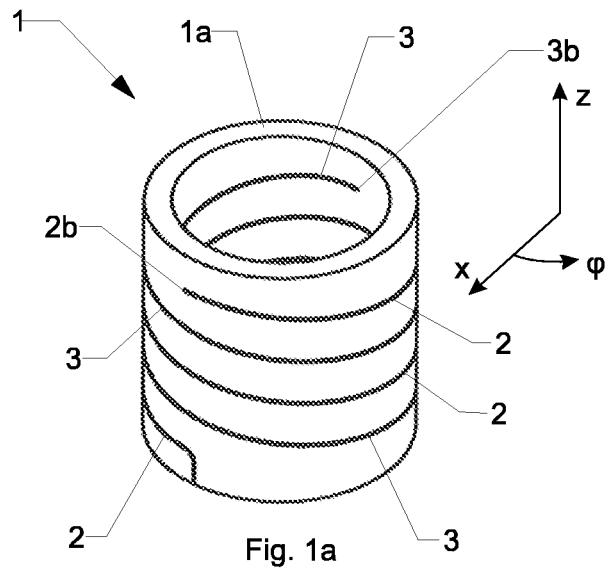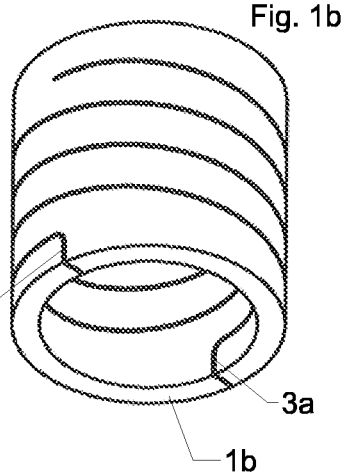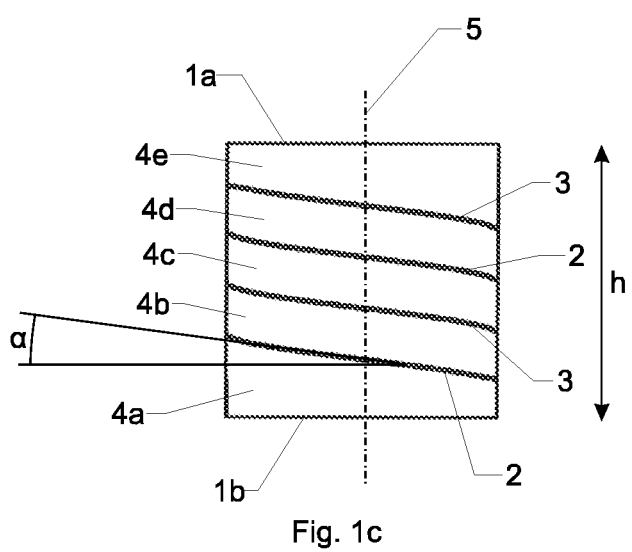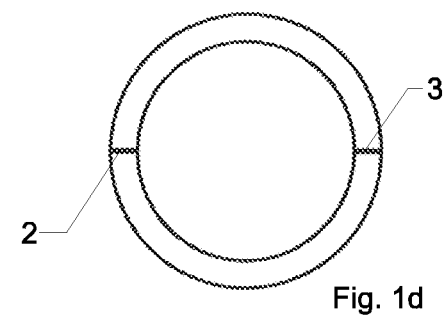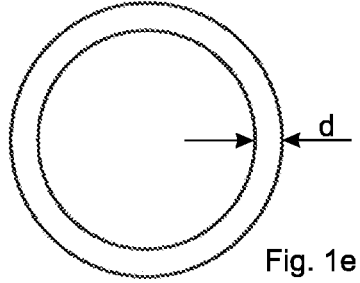

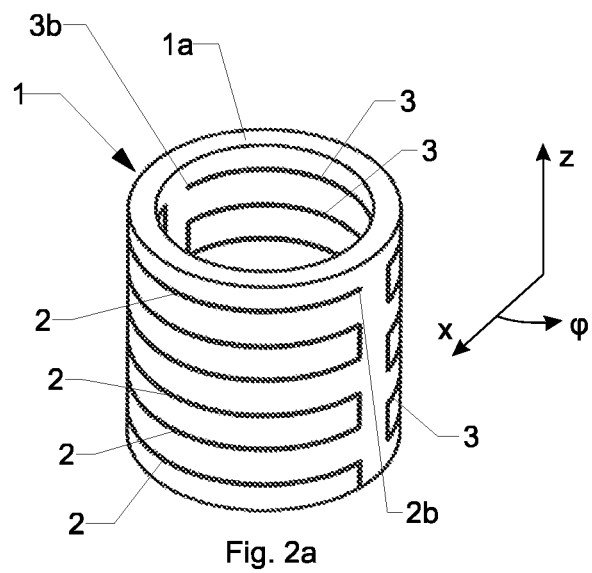
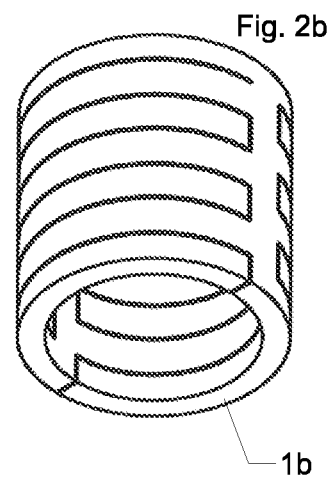
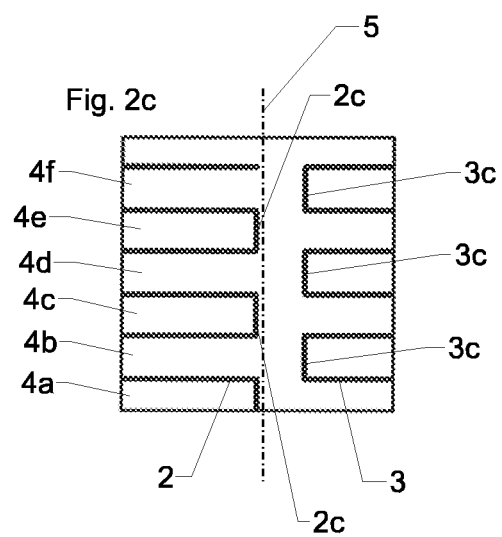
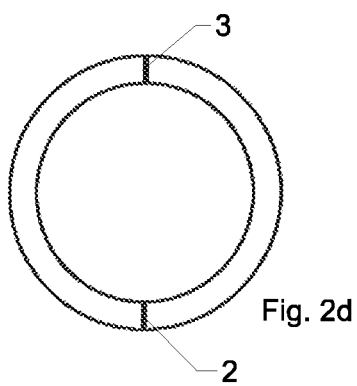
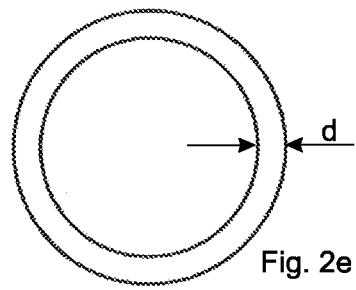

PERMANENT MAGNET FOR USE IN AN ELECTRIC MACHINE WITH ONE OR MORE GROOVES

TECHNICAL FIELD

The invention relates to a permanent magnet for use in an electric machine, which has the form of a one piece hollow cylinder, in particular a hollow circular cylinder.

BACKGROUND ART

Permanent magnet machines, in particular permanent magnet machines with single-tooth windings, often suffer from eddy current losses resulting from eddy currents induced within the permanent magnets. Eddy currents lead to the generation of heat which can result in thermal overloading and failure of the electrical machine. On the one hand the eddy currents are caused by a changing/pulsating magnet field in the air gap of the electric machine, the pulsation of the air gap field depending on the grooving and the current feed of the stator of the electric machine. On the other hand the eddy currents are caused by a changing magnetic flow caused by feeding currents to the single-tooth windings of an electric machine.

To reduce eddy current losses it is known on the one hand to segment the permanent magnets into a plurality of permanent magnet segments that are separate from each other (see for example EP 1 976 096 A2), with the plurality of permanent magnet segments being isolated from each other and bonded together. The number of separate permanent magnet segments depends on the particular geometry of the electrical machine.

Grooves are preferably formed by wire erosion cutting. After the groove has been formed in the permanent magnet it may be filled with an insulation material, for example a polymer plastic, and in particular an acrylic plastic.

DISCLOSURE OF THE INVENTION

It is an object of the invention to provide a permanent magnet, which is easy to produce and has excellent eddy-current loss properties and mechanical stability for the use in electrical machines.

This object is solved by the independent claim. According to this, a permanent magnet for use in an electric machine is a one piece hollow cylinder, in particular a hollow circular cylinder. The permanent magnet comprises one or more grooves dividing the permanent magnet in at least two sections that are interconnected.

A hollow cylinder is a cylinder with an arbitrary base and a hollow interior. A hollow circular cylinder is a cylinder with an annular base perpendicular to the cylinders' axis.

"One piece" means one part consisting of a magnetic material. Two pieces interconnected via an insulation material, in particular an adhesive, are two pieces and not one piece, since they are not interconnected via a magnetic material.

The grooves reduce the eddy current losses of the cylindrical permanent magnet. A one piece permanent magnet with grooves is much cheaper and easier to produce compared to a permanent magnet with a plurality of permanent magnet segments that are bonded by an adhesive. Furthermore, the magnet field is more homogeneous compared to a permanent magnet with separate segments.

Advantageously, the one or more grooves are helixes, i.e. the one or more grooves wind around the mantle of a cylinder with a constant gradient. The one or more grooves have the form of a helicoid.

The helix is the general form of the grooves. It does not exclude, for example, that the ends of the grooves are differently shaped.

Helical grooves are very easy and cost-efficient to produce, in particular by wire cutting. In a first step, the wire is arranged in a predefined angle relative to the hollow cylinder and in a second step, the hollow cylinder is rotated in order to cut the groove.

Preferably, the permanent magnet comprises exactly two grooves. This has the advantage that the two grooves can be cut simultaneously which makes the production even more efficient.

Furthermore, the permanent magnet can comprise two or more grooves which do not touch or cross each other.

In a preferred embodiment, the one or more grooves wind with a gradient greater than or equal to zero around the mantle of a cylinder, in particular wherein the gradient varies.

Advantageously, the hollow cylinder form comprises a bottom base and a top base, wherein the one or more grooves abut the bottom base in a 90° angle, and/or the one or more grooves do not abut the top base.

The angle of 90° improves the stability of the permanent magnet at the one end of the grooves.

In particular, the one or more grooves are arranged axially symmetrically with the cylinder axis as the symmetry axis. The symmetry of the grooves allows a simultaneous cutting which makes the permanent magnet cheaper.

Leaving the grooves empty avoids any ageing or temperature related issues. But it may be preferred that the one or more grooves are filled with insulation material, in particular a polymer plastic, and in particular an acrylic plastic.

Preferably, the permanent magnet consists of or comprises a material, in particular a sintered material, which consists of or comprises an alloy of neodymium, iron and boron or an alloy of samarium and cobalt.

In particular, the one or more grooves have a depth which is equal to the depth of the hollow cylinder wall.

Furthermore, a permanent magnet, which comprises two grooves is advantageous, because the two grooves can be cut simultaneously.

BRIEF DESCRIPTION OF THE DRAWINGS

The invention will be better understood and objects other than those set forth above will become apparent when consideration is given to the following detailed description thereof. Such description makes reference to the annexed drawings, wherein:

FIG. 1a to 1e show a first exemplary embodiment of a permanent magnet with two grooves in different views; and FIGS. 2a to 2e show a second exemplary embodiment of a permanent magnet with two grooves in different views.

MODES FOR CARRYING OUT THE INVENTION

The FIGS. 1a to 1e show a first exemplary embodiment of a permanent magnet. FIG. 1a shows a perspective view with the top base 1a and the coordinate system x, z, φ. FIG. 1b shows a perspective view with the bottom base 1b, FIG. 1c shows a side view, FIG. 1d shows a bottom view and FIG.

1e shows a top view. The FIGS. 2a to 2e show the same views for a second embodiment.

Both embodiments show a permanent magnet 1 with a form of a hollow circular cylinder. The hollow circular cylinder has a bottom base and a top base formed as congruent circles with a thickness d and a height h.

The permanent magnet 1 has two grooves 2 and 3. It can be seen that the grooves 2 and 3 cut right through the permanent magnet 1 in x-direction. In other words, the grooves extend completely through the wall thickness d of the permanent magnet 1.

The grooves 2 and 3 start at the bottom base 1b in the vertical z-direction, i.e. with an angle of 90° relative to the bottom base 1b. After a short vertical section 2a and 3a the grooves 2 and 3 have a helical course, i.e. the grooves 2 and 3 wind around the mantle of the hollow circular cylinder with a constant gradient of the angle α. The gradient of both grooves 2 and 3 are identical and constant until the ends 2b and 3b of the grooves 2 and 3. The grooves 2 and 3 do not abut the top base 1a. The two grooves 2 and 3 are arranged symmetrically with respect to the cylinder axis 5.

The grooves 2 and 3 run between each other and enclose several sections 4a to 4e which are interconnected. The permanent magnet is one piece.

The width of the groove 2 and 3 lies preferably in a range of 0.05 millimeters to several 0.1 millimeters. The width can be in particular 0.14 millimeters or 0.25 millimeters as preferred examples. Preferably, the width of the grooves 2 and 3 are as small as possible.

The depth d of the permanent magnet 1 lies for example in the range of 1.5 to 3 millimeters but can be more or less. The full diameter of the cylinder lies for example in the range of 5 to 50 mm and the height h lies for example in a range until 150 mm.

The material of the permanent magnet may comprise or consist of an alloy of neodymium, iron and boron, and it may thus be a so called NdFeB permanent magnet. Or the material of the permanent magnet may comprise or consist of an alloy of samarium and cobalt and it may thus be a so called SmCo permanent magnet. Of course, other materials may be employed. The use of such magnets is known to the skilled person and such magnets may in particular be used for an electric machine, which may, for example, be a permanent magnet machine or a synchronous machine. The permanent magnet may be arranged on the rotor or on the stator of the electric machine. The electric machine may be used as motor, e.g. as servomotor, and/or as generator. The electric machine may in particular be used as hybrid motor, especially as starter-generator for example in vehicles.

In the shown embodiment, the grooves 2 and 3 are filled with an isolating material, for example a glue or a polymer plastic, and in particular an acrylic plastic. In particular so called impregnating or trickle resins may be used.

The gradient with the angle α can be constant or can vary and the angle α can be chosen arbitrarily, in particular dependent on the induced eddy currents.

A preferred method of manufacture of a permanent magnet according to the invention is described in the following:

A blank is pressed in a magnetic field from pulverulent material from which the permanent magnet 1 shall be made, for example the materials mentioned above. The magnetic field serves in a known manner to provide a preferred magnetic orientation to the blank. The blank is pressed and then sintered as known to the skilled person.

In a further step, the blank is cut and ground until it reaches the desired cylindrical form. A drill bit creates a hole along the cylindrical axis such that a hollow cylinder is created.

By a cutting step, performed with known machinery, for example erosion wire cutting machines, the hollow circular cylinder is provided with two grooves 2 and 3 as described above. Since the grooves 2 and 3 are axially symmetrically arranged with respect to the central cylinder axis, the grooves 2 and 3 can be cut simultaneously with one single erosion wire.

After arriving at the end of the grooves 2 and 3, the erosion wire is cut off. The grooves can be filled with insulation material and surface treatments are possible.

The FIGS. 2a to 2e show a second exemplary embodiment. The reference numbers are the same as used in the FIGS. 1a to 1e. The difference between the first exemplary embodiment and the second exemplary embodiment lies in the course of the grooves 2 and 3. In the second exemplary embodiment, the grooves generally run in horizontal direction wherein the directions change several times by 180°. The reversals of direction are marked by the reference numbers 2c and 3c. The grooves 2 and 3 are arranged symmetrically with respect to the cylinder axis 5.

While there are shown and described presently preferred embodiments of the invention, it is to be distinctly understood that the invention is not limited thereto but may be otherwise variously embodied and practiced within the scope of the following claims.

The invention claimed is:

1. A permanent magnet for use in an electric machine, the permanent magnet being a one-piece hollow circular cylinder,
   wherein the permanent magnet comprises one or more grooves dividing the permanent magnet in at least two sections that are interconnected,
   wherein the one or more grooves wind with a gradient greater than or equal to zero around the mantle of the hollow cylinder, wherein the gradient is a constant gradient or a varying gradient.

2. The permanent magnet according to claim 1, wherein the one or more grooves are helixes.

3. The permanent magnet according to claim 1, comprising exactly two grooves.

4. The permanent magnet according to claim 1, comprising two or more grooves,
   wherein the grooves do not touch or cross each other.

5. The permanent magnet according to claim 1, wherein the one or more grooves are arranged axially symmetrically with the cylinder axis as the symmetry axis.

6. The permanent magnet according to claim 1, wherein each one of the one or more grooves comprise at least two reversals of direction.

7. The permanent magnet according to claim 1, wherein the one or more grooves are filled with insulation material, a polymer plastic, and/or an acrylic plastic.

8. The permanent magnet according to claim 1, wherein the permanent magnet comprises a sintered material, which comprises an alloy of neodymium, iron and boron.

9. The permanent magnet according to claim 1, wherein the one or more grooves have a depth d which is equal to the depth of the hollow cylinder wall.

10. A method for manufacturing a permanent magnet according to claim 1,
    wherein the permanent magnet comprises exactly two grooves,
    wherein the two grooves are cut simultaneously.

11. The method according to claim 10, wherein the two grooves are cut simultaneously by wire cutting.

12. The permanent magnet according to claim 1, wherein the permanent magnet comprises a sintered material, which comprises an alloy of samarium and cobalt.

13. The permanent magnet according to claim 1, wherein the permanent magnet consists of a sintered material, which consists of an alloy of neodymium, iron and boron.

14. The permanent magnet according to claim 1, wherein the permanent magnet consists of a sintered material, which consists of an alloy of samarium and cobalt.

15. The permanent magnet according to claim 1, wherein the gradient is a constant gradient.

16. The permanent magnet according to claim 1, wherein the gradient is a varying gradient.

17. A permanent magnet for use in an electric machine, the permanent magnet being a one-piece hollow circular cylinder,
wherein the permanent magnet comprises one or more grooves dividing the permanent magnet in at least two sections that are interconnected,
wherein the hollow cylinder comprises a bottom base and a top base, wherein
the one or more grooves abut the bottom base in a 90° angle, and/or,
the one or more grooves do not abut the top base.

18. The permanent magnet according to claim 17, wherein the one or more grooves abut the bottom base in a 90° angle.

19. The permanent magnet according to claim 17, wherein the one or more grooves do not abut the top base.

20. The permanent magnet according to claim 17, wherein the one or more grooves abut the bottom base in a 90° angle, and the one or more grooves do not abut the top base.

* * * * *